(12) United States Patent
Sekiguchi et al.

(10) Patent No.: US 8,971,578 B2
(45) Date of Patent: Mar. 3, 2015

(54) DRIVING SUPPORT APPARATUS

(71) Applicant: Fuji Jukogyo Kabushiki Kaisha, Tokyo (JP)

(72) Inventors: Hiroyuki Sekiguchi, Tokyo (JP); Seisuke Kasaoki, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 14 days.

(21) Appl. No.: 13/843,076

(22) Filed: Mar. 15, 2013

(65) Prior Publication Data

US 2013/0259309 A1   Oct. 3, 2013

(30) Foreign Application Priority Data

Mar. 29, 2012   (JP) ................................. 2012-077037

(51) Int. Cl.
*G06K 9/00* (2006.01)
*B60T 7/22* (2006.01)
*B60W 30/09* (2012.01)
*B60W 30/095* (2012.01)
*B60W 40/04* (2006.01)
*G08G 1/16* (2006.01)

(52) U.S. Cl.
CPC ........ *G06K 9/00624* (2013.01); *G06K 9/00805* (2013.01); *B60T 7/22* (2013.01); *B60W 30/09* (2013.01); *B60W 30/0956* (2013.01); *B60W 40/04* (2013.01); *G08G 1/166* (2013.01)
USPC ........... 382/103; 382/104; 382/105; 340/907; 340/933

(58) Field of Classification Search
USPC .......... 382/103, 104, 105, 107; 340/907, 917, 340/933, 937
See application file for complete search history.

(56) References Cited

U.S. PATENT DOCUMENTS

| 6,945,346 | B2 * | 9/2005 | Massen ......................... 180/170 |
| 7,602,945 | B2 * | 10/2009 | Kubo et al. ................... 382/104 |
| 7,640,903 | B2 * | 1/2010 | Stork et al. ................. 123/90.17 |
| 8,275,497 | B2 * | 9/2012 | Koch-Groeber et al. ....... 701/10 |
| 8,483,945 | B2 * | 7/2013 | Herink .......................... 701/302 |
| 8,605,948 | B2 * | 12/2013 | Mathony et al. .............. 382/104 |

FOREIGN PATENT DOCUMENTS

| JP | 2007-298430 A | 11/2007 |
| JP | 2009-042177 A | 2/2009 |
| JP | 2009-110168 A | 5/2009 |
| JP | 2010-260504 A | 11/2010 |
| JP | 2010-260504 A | 11/2010 |
| JP | 2010-266270 A | 11/2010 |
| JP | 2012-243049 A | 12/2012 |

* cited by examiner

*Primary Examiner* — Yosef Kassa

(74) *Attorney, Agent, or Firm* — McDermott Will & Emery LLP

(57) ABSTRACT

There is provided a driving support apparatus. A recognition controller determines whether an object detected by processing a captured image by an object detection unit is a smoke-like object or not in a smoke-like object determination unit. When the detected object is determined to be the smoke-like object, the recognition controller checks a range distribution in a region of the smoke-like object, adds the result as attribute information of "density", and transmits the resultant to a controller. The controller decides in a support operation level decision unit whether a pre-crash brake control can be executed or not and an intensity of an operation based on the attribute information of the smoke-like object. Thus, even if the smoke-like object is detected, an appropriate driving support process according to the condition can be executed.

1 Claim, 7 Drawing Sheets

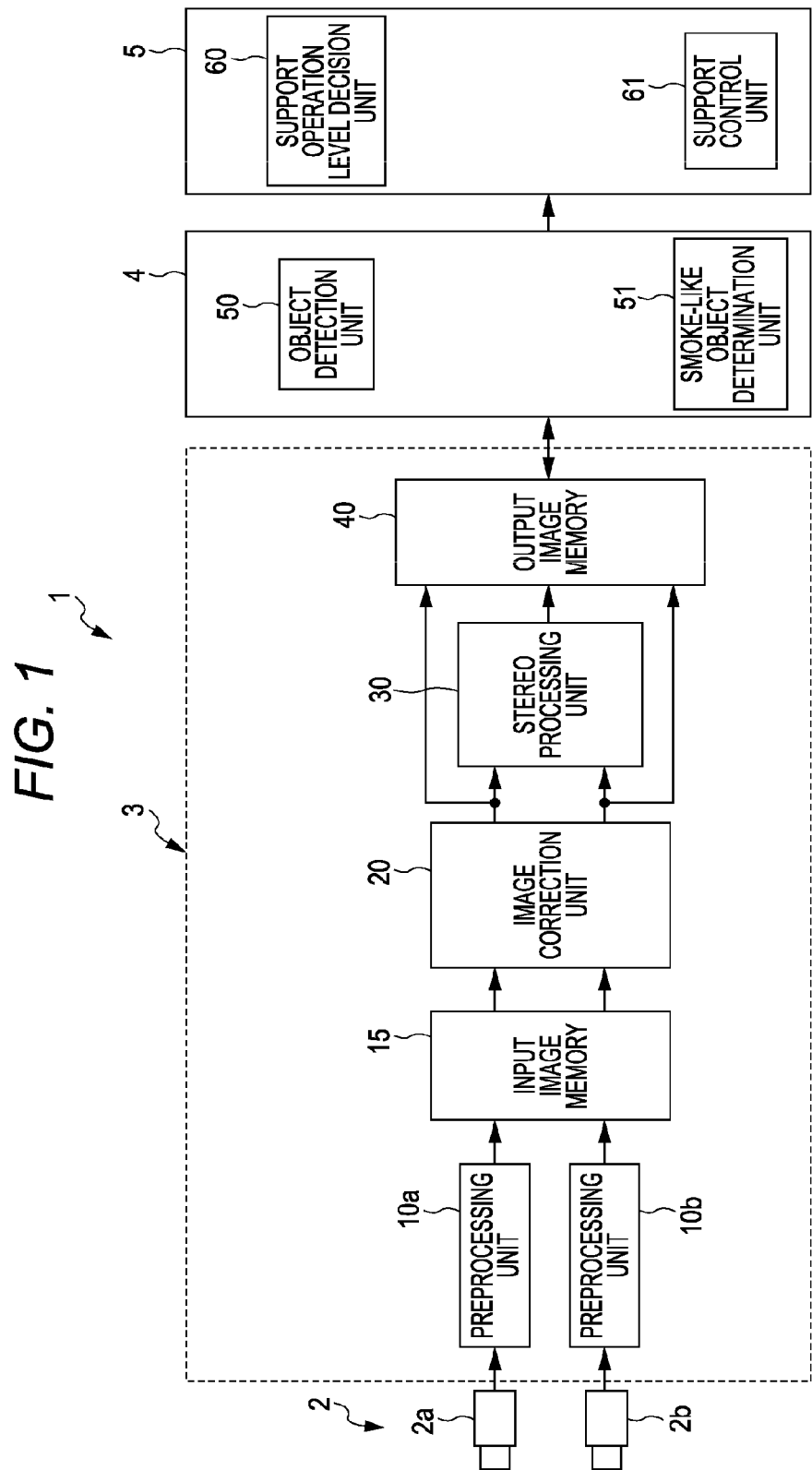

To

Tz

To

DRIVING SUPPORT APPARATUS

CROSS-REFERENCE TO RELATED APPLICATIONS

The present application claims priority from Japanese Patent Application No. 2012-077037 filed on Mar. 29, 2012, the entire contents of which are hereby incorporated by reference.

BACKGROUND OF THE INVENTION

1. Field of the Invention

The present invention relates to a driving support apparatus that processes a captured image to recognize a driving environment, and supports a driver to drive.

2. Description of Related Art

There has recently been developed a technique of executing a driving support control in a vehicle such as an automobile. In the driving support control described above, an object present around the vehicle is detected by analyzing a reflection wave of an electric wave emitted from an image captured by a camera or from a radar device, a possibility of collision between the vehicle and another object is determined based on information of the detected object, and when there is a possibility of collision, a driver's attention is drawn by sounding alarm, or an automatic steering or braking control is executed in order to avoid the collision.

For example, Japanese Unexamined Patent Application Publication (JP-A) No. 2010-260504 describes a technique in which an object present ahead in the advancing direction is detected, a determination is made as to the contact between the vehicle and the object based on the detection result of the object and a predetermined contact determination condition, and a throttle actuator, a brake actuator, a steering actuator, and an alarm device are operated at an appropriate timing according to the determination result.

On a cold area or on a place at high altitudes, in particular, amass of moisture may float above a road, or exhaust gas exhausted from an exhaust pipe of a vehicle ahead may stay there to form white smoke. When the mass of moisture or the exhaust gas is detected as an object, a driving support might be executed under the condition that is not exactly appropriate, such as the case in which the brakes are uniquely applied to stop the vehicle in front of the mass of moisture or exhaust gas. This control might give a driver a feeling of strangeness.

BRIEF SUMMARY OF THE INVENTION

The present invention is accomplished in view of the above-mentioned circumstance, and aims to provide a driving support apparatus that can execute an appropriate driving support according to a detected state even if a smoke-like object is detected.

An aspect of the present invention provides a driving support apparatus that recognizes a driving environment by processing an image captured by a stereo camera mounted to a vehicle for providing a driving support to a driver. The driving support apparatus includes: an object detection unit for detecting an object by grouping range information adjacent to each other in the captured image; a smoke-like object determination unit for determining whether the detected object is a smoke-like object or not, and for adding attribute information based on a distribution of the range information in a region of the smoke-like object when determining that the detected object is a smoke-like object; and a support operation level decision unit for deciding an operation level of the driving support to the smoke-like object based on the attribute information of the smoke-like object.

BRIEF DESCRIPTION OF THE SEVERAL VIEWS OF THE DRAWINGS

FIG. 1 is a diagram illustrating an overall configuration of a driving support apparatus;

DETAILED DESCRIPTION OF THE INVENTION

Figure 2A:
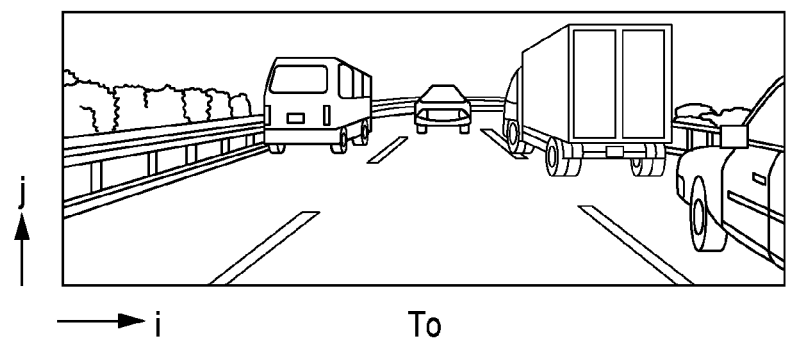
FIG. 2A is an explanatory view illustrating one example of a reference image.

An embodiment of the present invention will be described below with reference to the drawings.

A driving support apparatus 1 illustrated in FIG. 1 is mounted on a vehicle such as an automobile (not illustrated) for recognizing an external driving environment by processing an image captured by a camera 2, thereby performing various driving supports for a driver. Specifically, the driving support apparatus 1 includes an image processing engine 3 that processes an image captured by the camera 2, a recognition controller 4 that is composed of a microcomputer for recognizing an external environment based on image information processed by the image processing engine 3, and a controller 5 that performs each control for supporting the driver to drive based on the result of recognizing the external environment.

Controllers (not illustrated) executing various vehicle controls, such as a controller for an engine control, a controller for a transmission, and a controller for controlling a behavior of the vehicle (including a brake control), are connected to the controller 5. The controller 5 outputs a control instruction to the respective controllers for controlling the vehicle based on the result of recognizing the external environment by the recognition controller 4. For example, the controller 5 executes a pre-crash brake control for predicting risk and avoiding collision or reducing damage of the collision, a cruise control with a tracking function in all speed areas, and an alarm control for warning a driver that the vehicle wobbles in a lane or the vehicle drifts from the lane as a result of monitoring.

In the present embodiment, the camera 2 that captures a condition at the outside of the vehicle is a stereo camera that captures the same object from a different point of view, and is described below as a stereo camera 2 as needed. Specifically, the stereo camera 2 includes right and left cameras 2a and 2b arranged such that optical axes are parallel to each other. These two cameras 2a and 2b are mechanically fixed to have a predetermined base length (space between optical axes). Each of the cameras 2a and 2b is an imaging unit for a color-image capture, and includes an image sensor such as a CCD or CMOS image sensor. Each camera is integral with the image processing engine 3 and the recognition controller 4 to form a stereo camera unit, and is arranged at the inside of a front window at the upper part of a compartment.

The cameras 2a and 2b can change a shutter speed, and are synchronized with each other. One camera (left camera) 2a is used as a main camera for capturing a reference image for a stereo process, and the other camera (right camera) 2b is used as a sub-camera for capturing a comparison image for the stereo process.

The image processing engine 3 reads a pair of right and left images captured by the stereo camera 2, and detects a disparity for the same object by a stereo matching process in which corresponding points in two images are searched, thereby measuring a distance based on the disparity according to a principle of triangulation. Therefore, the image processing engine 3 includes pre-processing units 10a and 10b that pre-process imaging signals of the right and left cameras 2a and 2b, an input image memory 15 that stores the right and left preprocessed captured images, an image correction unit 20 that performs various correction processes to the captured images stored in the input image memory 15, a stereo processing unit 30 that performs a stereo matching process to the output from the image correction unit 20 so as to generate a range image indicating range information in a form of an image, and an output image memory 40 that stores the range image generated by the stereo processing unit 30 and the images (right and left original images after the preprocess and the correction process) captured by the right and left cameras 2a and 2b.

In the present embodiment, each of the cameras 2a and 2b is formed as an imaging unit having therein various circuits such as an amplifier for amplifying an analog imaging signal from the image sensor, and an A/D converter that converts the analog imaging signal into a digital signal having a predetermined bit number. Therefore, the preprocessing units 10a and 10b execute an electronic shutter control to the cameras 2a and 2b, a gain/offset control and adjustment of the amplifier, a brightness correction including a gamma correction by an LUT table, and a shading correction. The preprocessing units 10a and 10b also execute an address control when data is written to the input image memory 15, whereby the right and left camera images (digital images) are stored in a predetermined address in the input image memory 15.

The image correction unit 20 sets an image processing coordinate, adjusts a size of an image, sets various parameters in an address control, performs a position correction process for correcting an optical displacement including a lens distortion, and performs a filter correction process for eliminating noise. More specifically, the image correction unit 20 executes, to the image data read from the input image memory 15, a process for correcting the optical displacement caused by the lens distortion of each camera 2a and 2b, misalignment in the mounting position of each camera 2a and 2b, a variation in a focal distance of each camera 2a and 2b, and displacement on an imaging surface of each camera.

The optical displacement is corrected as described below. Specifically, a rotational displacement and translation shift in the images captured by the cameras 2a and 2b are geometrically corrected by using an affine correction table, and a non-linear distortion such as a lens distortion is corrected by using a non-linear correction table. According to the correction described above, the optical position of each of the cameras 2a and 2b is precisely adjusted equivalently. In the filter correction process, noise included in the right and left digital images (tone image) stored in the input image memory is eliminated by using a spatial filter such as 3×3 filter, for example. When the noise eliminating process is applied to the image data to which the geometric correction including the correction of the lens distortion by the affine correction is performed, the corresponding filter value is changed.

The right and left image data outputted from the image correction unit 20 is inputted to the stereo processing unit 30. The stereo processing unit 30 obtains a displacement amount (disparity) from a pair of images (reference image and comparison image) obtained by capturing a surrounding environment at the outside of the vehicle by use of the stereo camera 2 according to the stereo matching process, and stores the range information based on the displacement amount in the output image memory 40 in the form of an image.

Figure 2B:
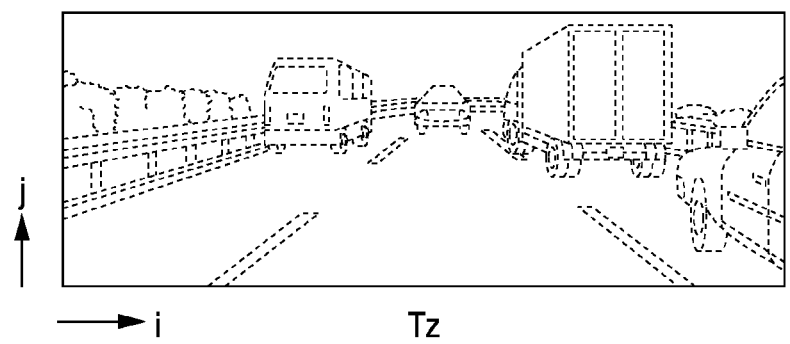
FIG. 2B is an explanatory view illustrating one example of a range image.

As the stereo matching process, a known region search method can be applied. In the region search method, a small region (also referred to as a block or window; hereinafter referred to as a block) is set around a certain point in the reference image, a block having the same size is formed around a certain point in the comparison image, and the corresponding point is searched. In the search process of the corresponding point in the region search method, a correlated calculation between the block on the comparison image and the block on the reference image is carried out, while shifting the block on the comparison image. The displacement amount of the coordinate for the block having the largest correlation value is calculated. This displacement amount is replaced with a brightness value on the corresponding position on the image coordinate system, and stored as the range image in the form of an image. For example, a brightness value according to the displacement amount is assigned to each block on (i, j) coordinate of a reference image To as illustrated in FIG. 2A, so that a range image Tz illustrated in FIG. 2B is formed.

The recognition controller 4 detects an object present around the vehicle by using a three-dimensional position of the object whose distance is measured by the image processing engine 3. In the process of detecting an object by the recognition controller 4, not only a fixed object whose shape is not changed, such as an architectural structure or vehicle, but also a smoke-like object such as a mass of particles floating in a space (moisture or exhaust gas) can be detected.

When detecting the smoke-like object such as moisture or exhaust gas, the recognition controller 4 checks a range distribution in a region of the smoke-like object, adds the range distribution as attribute information of "density", and transmits the resultant to the controller 5. The controller 5 decides a support operation level for the driving support to the smoke-like object detected by the recognition controller 4, based on its attribute information. In the present embodiment, whether the pre-crash brake control can be executed or not, and the intensity of the operation, are decided as the level of the support operation in the driving support.

Specifically, it is supposed that the pre-crash brake is uniquely applied because priority is given to safety in the case where the smoke-like object such as moisture or exhaust gas is detected. In this case, if the smoke-like object is thin moisture, and the driver can see ahead, unnatural driving support might be executed against the driver's option, which might cause irritation. On the other hand, when thick moisture by which the driver cannot see ahead is generated in front of the vehicle, a vehicle ahead might be present in the moisture or just in front of the vehicle. When the pre-crash brake is uniquely inhibited in order to prevent the driver from feeling irritation in this case, some trouble might be caused from the viewpoint of security.

Figure 3:
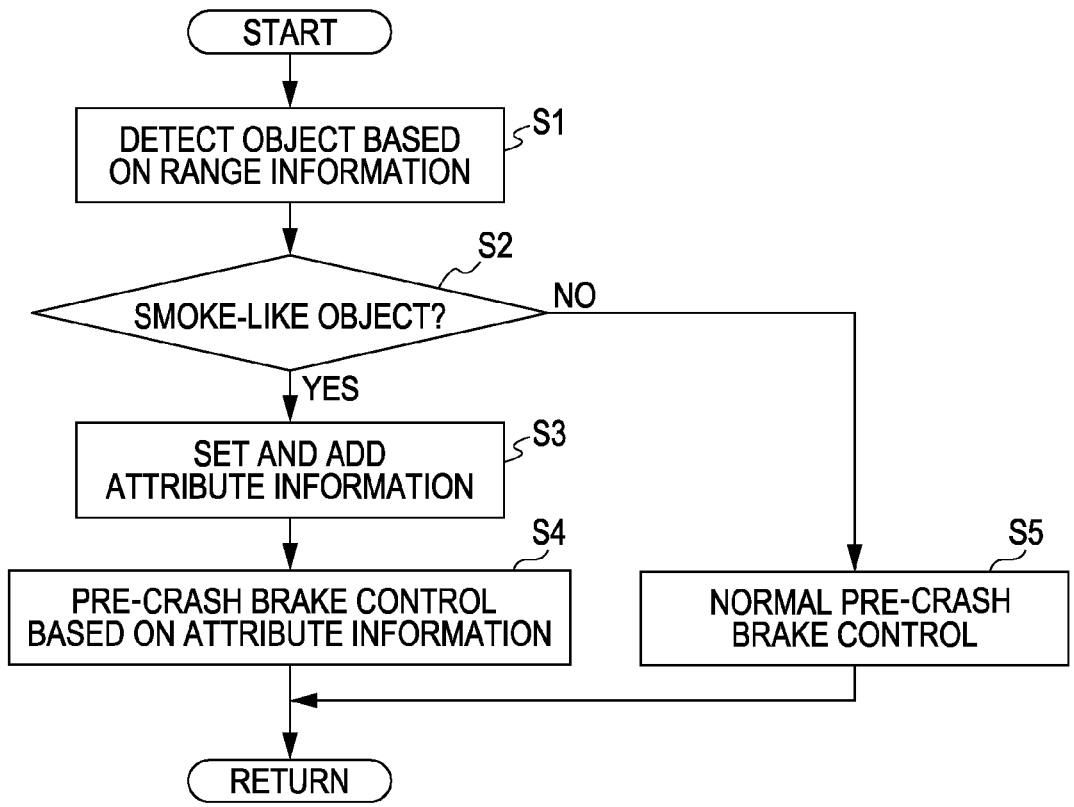
FIG. 3 is a flowchart illustrating a driving support process to a smoke-like object.

Therefore, the recognition controller 4 includes an object detection unit 50, and a smoke-like object determination unit 51, and the controller 5 includes a support operation level decision unit 60, and a support control unit 61 as illustrated in FIG. 1. Even if a smoke-like object is detected, a driving support process appropriate for the condition can be made with this configuration. The driving support process for the smoke-like object is executed in accordance with a procedure in a flowchart in FIG. 3. The driving support process for the smoke-like object will be described below with reference to the flowchart in FIG. 3.

Figure 4:
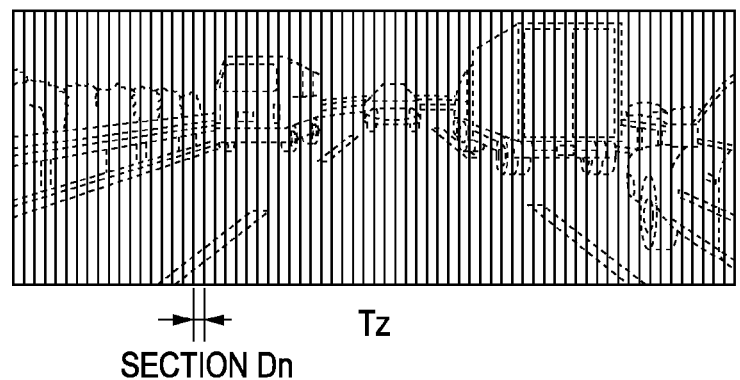
FIG. 4 is an explanatory view for describing each section formed by dividing a range image.
Figure 5:
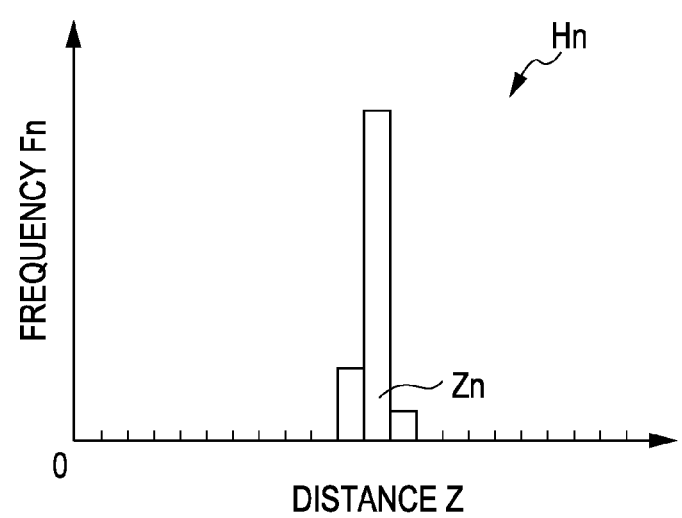
FIG. 5 is an explanatory view illustrating one example of a histogram used for extracting a distance of an object in each section in FIG. 4.

The first step S1 is a process of the object detection unit 50. In this step, information of adjacent ranges is grouped based on the range information from the image processing engine 3, in order to detect an object. Specifically, the object detection unit 50 reads the range image from the output image memory 40, and divides the range image Tz into reed-shaped sections Dn extending in the vertical direction with a predetermined pixel width as illustrated in FIG. 4. The object detection unit 50 creates a histogram Hn illustrated in FIG. 5 for a distance Z assigned to a pixel block belonging to each of the reed-shaped sections Dn, and specifies a class value whose frequency Fn is the maximum as the distance Zn of the object in the reed-shaped section Dn. This process is carried out for all sections Dn.

Figure 6:
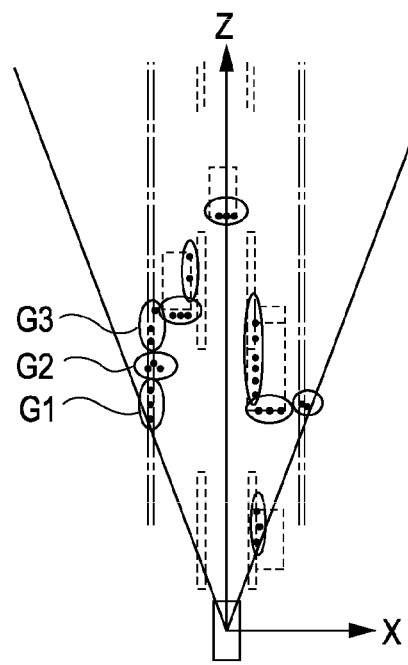
FIG. 6 is an explanatory view for describing a group of each point plotted on a real space.

The distance Zn acquired for each section Dn is plotted on a real space. The adjacent points are grouped into groups G1, G2, G3, . . . based on the distance between the points and directivity of each point as illustrated in FIG. 6. In the present embodiment, each point belonging to each group undergoes a straight-line approximation, whereby the groups are classified such that the group having the points arranged almost parallel to the widthwise direction of the vehicle, i.e., to the X axis direction, is labeled as "object", while the group having points arranged almost parallel to the longitudinal direction of the vehicle, i.e., to the Z axis direction, is labeled as "sidewall". A "corner point" is labeled to a portion that is regarded as an intersection of the "object" and the "sidewall" of the same object. Each label is combined based on the adjacency relationship of each label, and the combined result is detected as one object.

Figure 7:
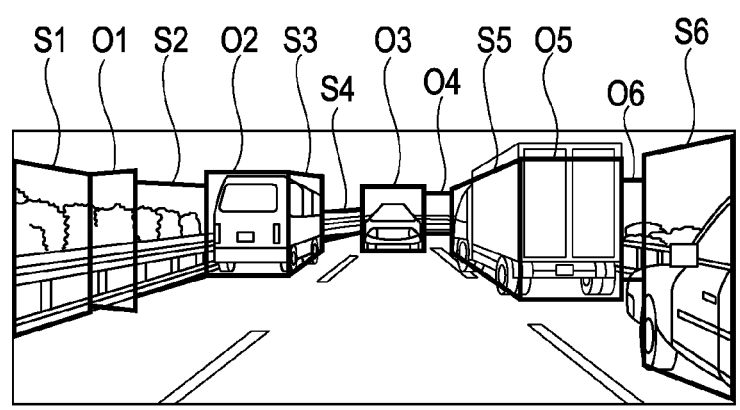
FIG. 7 is an explanatory view illustrating each object that is detected as enclosed by a rectangular frame on the reference image.

As illustrated in FIG. 7, a rectangular frame enclosing each of the captured objects is set on the reference image based on the information of each of the detected objects, whereby each region in which each object is captured is set, and each object is detected on the reference image. FIG. 7 illustrates an example in which [sidewall SW1], [object O1], [sidewall SW2], [object O2, corner point C, and sidewall SW3], [sidewall SW4], [object O3], [object O4], [sidewall SW5, corner point C, and object O5], [object O6], and [sidewall SW6] are respectively detected as one object. The information of the object detected as described above, i.e., the information of the distance involved with the object, the coordinate of an end point or midpoint of the approximate straight line of the group, and the coordinate of the vertex of each frame in the reference image are respectively stored in the memory.

Processes in next steps S2 and S3 are the process of the smoke-like object determination unit 51. Specifically, the process in step S2 is the process of determining whether or not the detected object is a smoke-like object, such as moisture or exhaust gas above the road, and the process in step S3 is the process of adding the attribute information based on the distribution of the range information in the region of the smoke-like object when the detected object is the smoke-like object.

Whether the detected object is the smoke-like object or not is determined according to equations (1) to (3) as described below. For example, an average Zave of each information of the distance Zn belonging to the object is calculated. An average deviation Zdif as a dispersion amount to the average, or an average (average in distance difference) ΔZave of an absolute value of a difference between the distance Zn and a distance Znadj of the information adjacent to the information of the distance Zn belonging to the object is used for the determination.

$$Zave = \Sigma Zn / ndet \qquad (1)$$

$$Zdif = \Sigma |Zn - Zave| / ndet \qquad (2)$$

$$\Delta Zave = \Sigma |Zn - Znadj| / ndet \qquad (3)$$

The ndet in each equation represents a total number of the sections Dn from which the distance Zn is effectively detected, out of all sections Dn belonging to the region in the rectangular frame on the reference image formed by capturing each object, and the sum in numerator in each equation is obtained for the effectively detected distance Zn.

Figure 8:
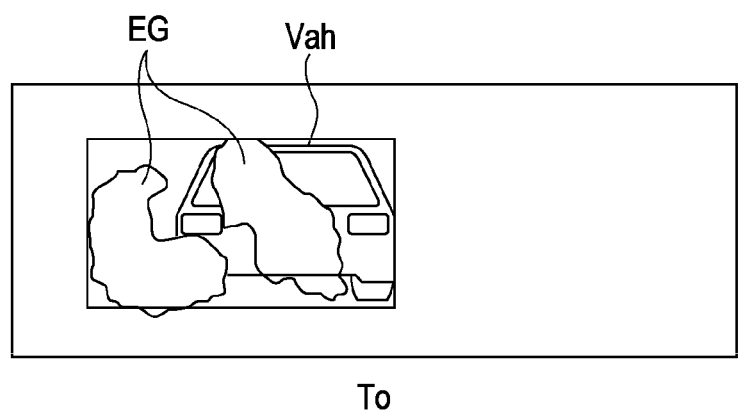
FIG. 8 is an explanatory view illustrating a reference image indicating that exhaust gas is detected together with a vehicle ahead.
Figure 9:
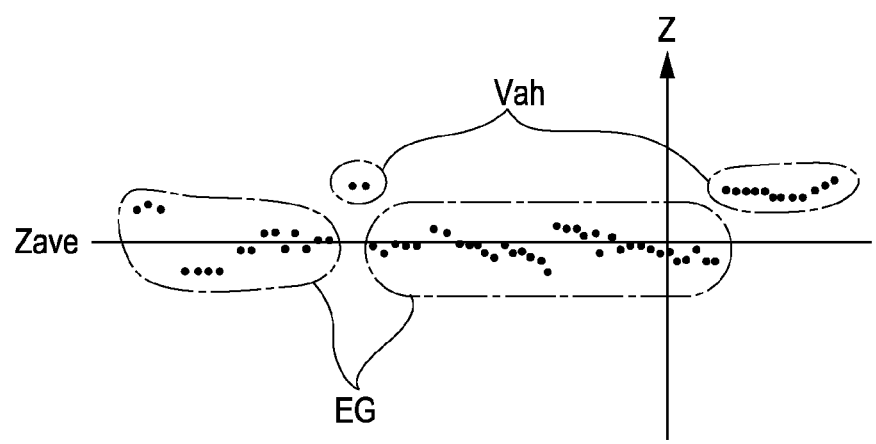
FIG. 9 is an explanatory view illustrating each point having large variation in distance when the exhaust gas is detected.

For example, it is supposed that the exhaust gas EG emitted from an exhaust pipe is detected together with a vehicle ahead Vah. When each information of the distance Zn to the object, i.e., the exhaust gas EG and the vehicle ahead Vah is plotted on the real space as illustrated in FIG. 8, points that are considered to correspond to the information of the distance Zn to the vehicle ahead Vah are linearly plotted, but the points that are considered to correspond to the information of the distance Zn to the exhaust gas EG are dispersed, and further, the portion where the difference between the information of the distance Zn is large appears on some places, as illustrated in FIG. 9. Therefore, the average deviation Zdif of the distance Zn calculated by the above-mentioned equation (2) becomes relatively large, and the average of the distance difference ΔZave calculated by the equation (3) also becomes large.

A threshold value is set beforehand for each of the average deviation Zdif and the average of the distance difference ΔZave. Whether the detected object is the smoke-like object or not can be determined by comparing the average deviation Zdif and the average of the distance difference ΔZave to the corresponding threshold value. When the average deviation Zdif and the average of the distance difference ΔZave are both larger than the corresponding threshold value, the detected object is determined to be the smoke-like object such as moisture or exhaust gas, and in other case, the detected object is determined to be a fixed object whose shape is not changed, such as a vehicle.

The reason why the determination is made by using two conditions that are the average deviation Zdif and the average of the distance difference ΔZave is to cover the case where the vehicle ahead greatly curves, and hence, the average deviation Zdif becomes larger than the threshold value. In this case, the average of the distance difference ΔZave becomes not more than the threshold value, so that the detected object can correctly be determined as not being the smoke-like object. Accordingly, the erroneous determination can be prevented.

When the detected object is not the smoke-like object, but the object whose shape is not changed by the determination described above, the support control unit 61 executes the normal pre-crash brake control (step S5). In the pre-crash brake control, the possibility of collision between the object and the vehicle is determined based on the relative speed (including the relative moving direction) between the vehicle and the object based on the range information of the object. When there is a possibility of collision, the brake actuator not illustrated is operated to control the brake pressure, in order to avoid the collision against the object.

Figure 10:
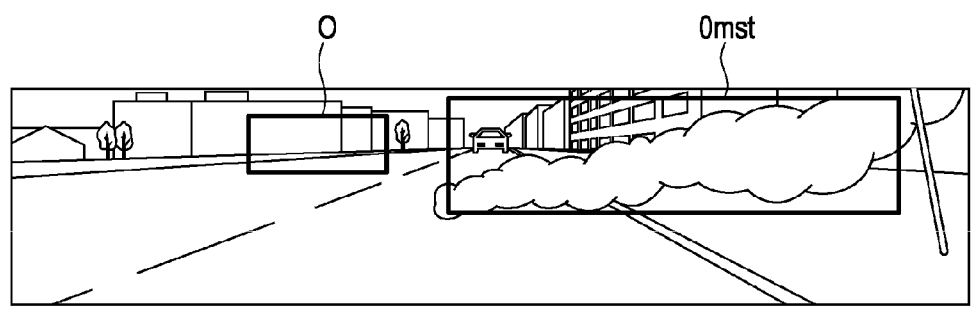
FIG. 10 is an explanatory view illustrating a smoke-like object.
Figure 11:
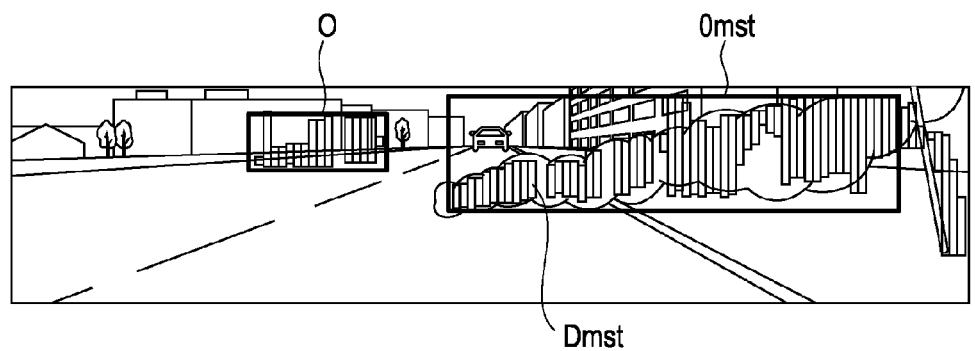
FIG. 11 is an explanatory view illustrating a section of range information in the frame region of the smoke-like object.

On the other hand, when the detected object is the smoke-like object, the "density" of the smoke-like object is determined, and is added as the attribute information (step S3). For example, when an object O whose shape is not changed is detected, and further, exhaust gas or mass of moisture floating above the road is detected as the smoke-like object Omst as illustrated in FIG. 10, the section (reed-shaped section) Dmst of the range information is checked in the region in the rectangular frame enclosing the smoke-like object Omst, and how much range information far from the range representing the smoke-like object Omst is included in each reed-shaped section Dmst is checked as illustrated in FIG. 11.

In the present embodiment, the density of the smoke-like object is classified into four levels of N1, N2, N3, and N4 as the attribute information of the smoke-like object for setting the attribute. The attribute N1 indicates that it is difficult for the driver to see ahead because the density of the smoke-like object is "thick". The attribute N2 indicates that the driver can see ahead to some extent, since the density of the smoke-like object is "moderate". The attribute N3 indicates that the driver can see ahead, since the density of the smoke-like object is "thin". The attribute N4 indicates that the driver can see ahead without any difficulty, since the density of the smoke-like object is "very thin".

For example, when the ratio of the range information far from the object in each of the reed-shaped sections in the frame region of the object is 30% or less, the attribute N1 (thick) is set; when the ratio is 30% to 50%, the attribute N2 (moderate) is set; when the ratio is 50% or more, the attribute N3 (thin) is set; and when the ratio is 70% or more, the attribute N4 (very thin) is set. The pre-crash brake control based on the attribute information is executed to the smoke-like object to which the attribute information is added (step S4).

In the pre-crash brake control based on the attribute information of the smoke-like object, the support operation level decision unit 60 decides whether the pre-crash brake control can be executed or not, and the intensity of the operation, based on the attribute information of the smoke-like object. Three levels, which are an alarm, collision possibility determination, and collision determination, are supposed as the intensity of the operation when the pre-crash brake control is executed. The operation level is set based on the attributes N1 to N4 as described below, whereby the brake operation for generating the deceleration corresponding to each level is allowed in the pre-crash brake control by the support control unit 61.

N1 (Thick):
Alarm brake, brake for collision possibility determination, and brake for collision determination are all allowed. N2 (moderate):
Alarm brake operation and brake operation for collision possibility determination are allowed. N3 (thin):
Only alarm brake operation is allowed. N4 (very thin):
Pre-crash brake for the smoke-like object is inhibited.

The alarm brake is an alarm brake having relatively small deceleration, and it can be applied from a maximum of 2.2 seconds before the collision. The brake for the collision possibility determination is applied when the possibility of collision is high, and it can be applied from a maximum of 1.4 seconds before the collision. The brake for the collision determination is applied for generating the maximum deceleration for avoiding the collision or reducing the damage, and it can be applied from the maximum of 0.6 second before the collision.

In the present embodiment, when the smoke-like object such as moisture or exhaust gas is detected, the attribute information is set by classifying its density, and based on the set attribute information, whether the pre-crash brake control as the driving support for the smoke-like object can be executed or not and the intensity of the operation are decided. Thus, the precrash brake can effectively be applied, while preventing unnecessary pre-crash brake operation.

What is claimed is:

1. A driving support apparatus that recognizes a driving environment by processing an image captured by a stereo camera mounted to a vehicle for providing a driving support to a driver, the driving support apparatus comprising:
   an object detection unit for detecting an object by grouping range information adjacent to each other in the captured image;
   a smoke-like object determination unit for determining whether the detected object is a smoke-like object or not, and adding attribute information when determining that the detected object is the smoke-like object, the attribute information being a density of the smoke-like object classified into multiple levels based on a distribution of the range information in a region of the smoke-like object; and
   a support operation level decision unit for deciding an operation level of the driving support to the smoke-like object based on the attribute information of the smoke-like object, wherein
   the support operation level decision unit decides whether a pre-crash brake control is executed or not to the smoke-like object, and an intensity of the operation classified into multiple levels, based on the attribute information classified into the multiple levels.

* * * * *